United States Patent
Samosky et al.

(10) Patent No.: US 10,083,630 B2
(45) Date of Patent: Sep. 25, 2018

(54) MODULAR, WIRELESS, DRUG SIMULANT INJECTION SENSOR SYSTEM AND METHODS OF EMPLOYING

(71) Applicant: UNIVERSITY OF PITTSBURGH-OF THE COMMONWEALTH SYSTEM OF HIGHER EDUCATION, Pittsburgh, PA (US)

(72) Inventors: Joseph Thomas Samosky, Pittsburgh, PA (US); Christopher James Siviy, Webster, NY (US); Michael Joseph Randazzo, Jamison, PA (US); Raymond James Van Ham, Pittsburgh, PA (US); Ahmed Ismail Kashkoush, Pittsburgh, PA (US); Zhannetta Vyacheslavovna Gugel, Pasadena, CA (US); Shi Tong Liu, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 467 days.

(21) Appl. No.: 14/689,758

(22) Filed: Apr. 17, 2015

(65) Prior Publication Data
US 2015/0379900 A1    Dec. 31, 2015

Related U.S. Application Data

(60) Provisional application No. 61/980,868, filed on Apr. 17, 2014.

(51) Int. Cl.
*G09B 23/28*    (2006.01)

(52) U.S. Cl.
CPC ................ *G09B 23/285* (2013.01)

(58) Field of Classification Search
CPC ......... G09B 23/285; G09B 23/28; G09B 5/00
(Continued)

(56) References Cited

U.S. PATENT DOCUMENTS

| | | | | |
|---|---|---|---|---|
| 3,448,277 A | * | 6/1969 | Jayko | ............... G01N 21/8507 250/573 |
| 5,201,753 A | | 4/1993 | Lampropoulos et al. | |

(Continued)

FOREIGN PATENT DOCUMENTS

EP    2 623 142 A1    8/2013

OTHER PUBLICATIONS

Bregman, R. et al., "The Smart Syringe: A Performance Measurement and Feedback System to Sense and Visually Display Injection Rate for Training IV Injection Technique", PhD. Poster presentation and live demonstration, University of Pittsburgh Department of Anesthesiology Research Day, May 5, 2009, 1 p.
(Continued)

*Primary Examiner* — Robert P Bullington
(74) *Attorney, Agent, or Firm* — Eckert Seamans Cherin & Mellott, LLC; Stephen A. Bucchianeri

(57) ABSTRACT

A device for monitoring the position of a plunger member slidingly engaged with a main body of a syringe includes a housing structured to be selectively coupled to the main body in a readily removable manner and a monitoring system disposed at least partially on or in the housing. The monitoring system is structured to detect the absolute position of the plunger member with respect to the main body in a manner which does not require any mechanical linkage with the plunger member.

12 Claims, 7 Drawing Sheets

(58) Field of Classification Search
USPC .......................................................... 434/262
See application file for complete search history.

(56) References Cited

U.S. PATENT DOCUMENTS

| | | | | | |
|---|---|---|---|---|---|
| 5,236,416 | A | * | 8/1993 | McDaniel | A61M 5/1456 128/DIG. 1 |
| 5,295,967 | A | * | 3/1994 | Rondelet | A61M 5/16854 128/DIG. 12 |
| 5,792,117 | A | * | 8/1998 | Brown | A61B 5/14532 235/462.04 |
| 6,110,148 | A | | 8/2000 | Brown et al. | |
| 6,113,578 | A | * | 9/2000 | Brown | A61B 5/14532 222/23 |
| 6,645,177 | B1 | * | 11/2003 | Shearn | A61M 5/1456 604/155 |
| 7,498,563 | B2 | * | 3/2009 | Mandro | A61M 5/145 250/231.13 |
| 9,295,778 | B2 | * | 3/2016 | Kamen | G06F 19/3406 |
| 2001/0056258 | A1 | * | 12/2001 | Evans | A61M 5/31533 604/131 |
| 2002/0128606 | A1 | * | 9/2002 | Cowan | A61M 5/1452 604/181 |
| 2003/0065287 | A1 | * | 4/2003 | Spohn | A61M 5/14566 604/154 |
| 2006/0116639 | A1 | * | 6/2006 | Russell | G06F 19/3418 604/131 |
| 2007/0083152 | A1 | * | 4/2007 | Williams, Jr. | A61M 5/172 604/65 |
| 2007/0142777 | A1 | * | 6/2007 | Klein | G01N 21/11 604/152 |
| 2010/0280486 | A1 | * | 11/2010 | Khair | A61M 5/142 604/506 |
| 2011/0087189 | A1 | * | 4/2011 | Jacobson | A61M 5/16827 604/506 |
| 2012/0268741 | A1 | * | 10/2012 | Pommereau | G01F 23/2921 356/343 |
| 2014/0288422 | A1 | * | 9/2014 | Brady | A61M 5/31568 600/432 |
| 2016/0166774 | A1 | * | 6/2016 | Leary | A61M 5/3135 604/506 |

OTHER PUBLICATIONS

Bregman, R. et al., "Continuous Color Visual Feedback for Safe and Accurate Device Operation: The Smart Syringe Injection Training System", PhD. Poster presentation and live demonstration, University of Pittsburgh Science 2009 Technology Showcase, Oct. 14, 2009, 1 p.

Whitmeier, A. et al., "Final Design Review: Wireless Interfacing Linear Positioning Syringe", Purdue University Senior Design Final Document, Oct. 23, 2002, 21 pp.

* cited by examiner

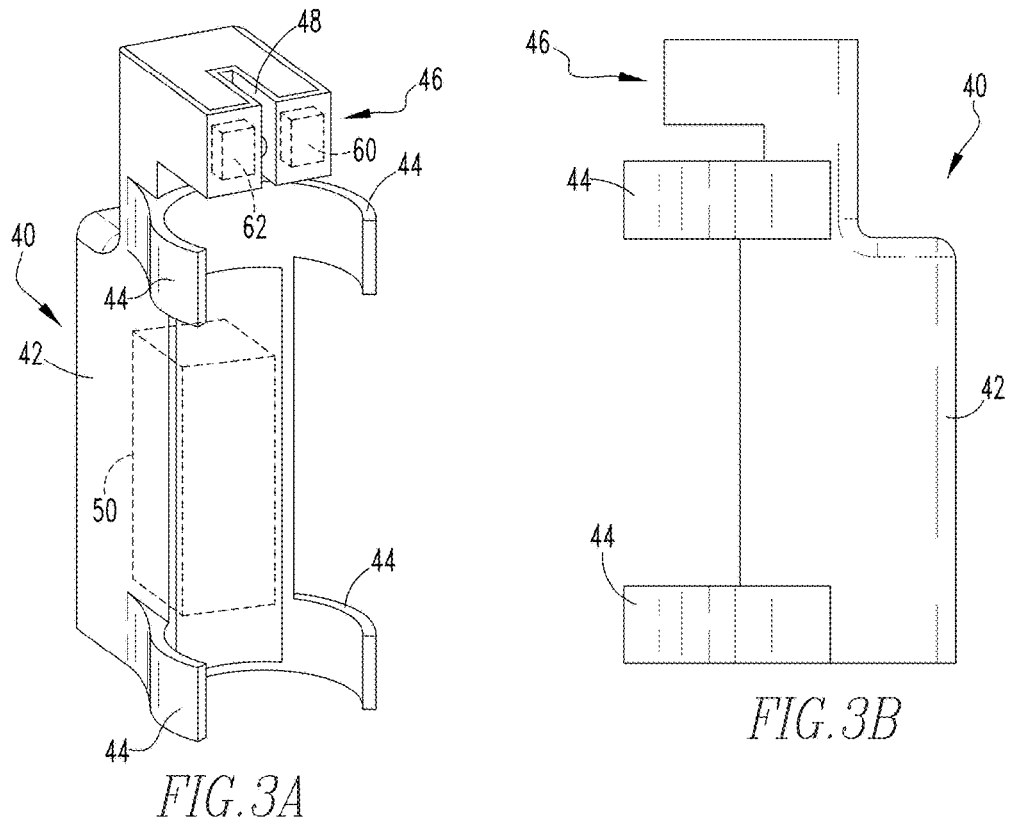
FIG.3A
FIG.3B
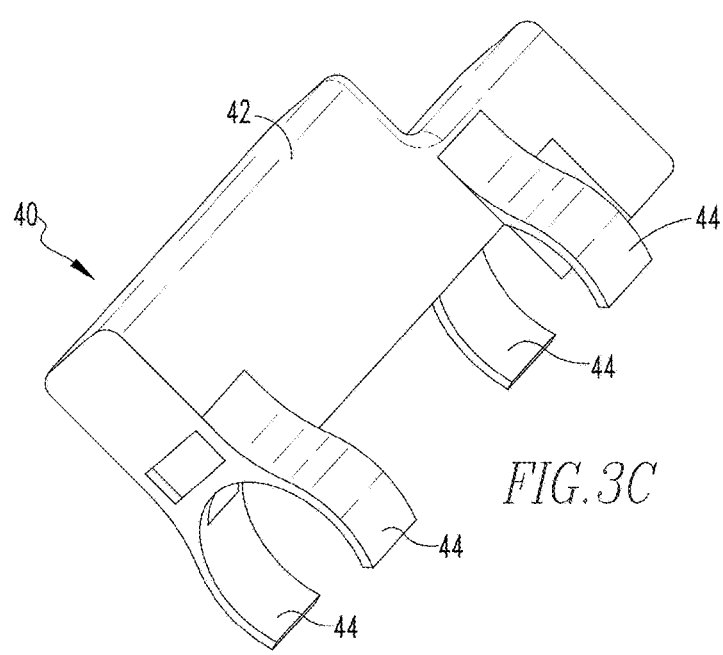
FIG.3C

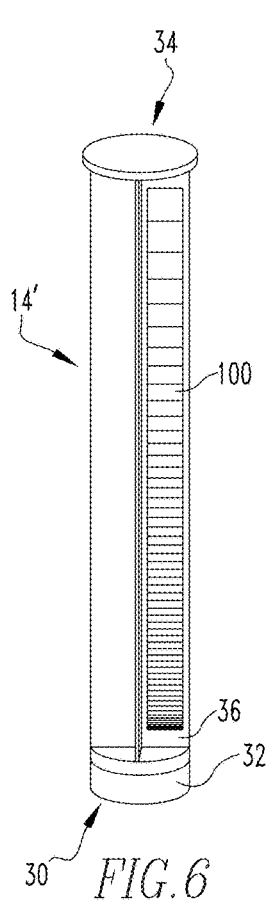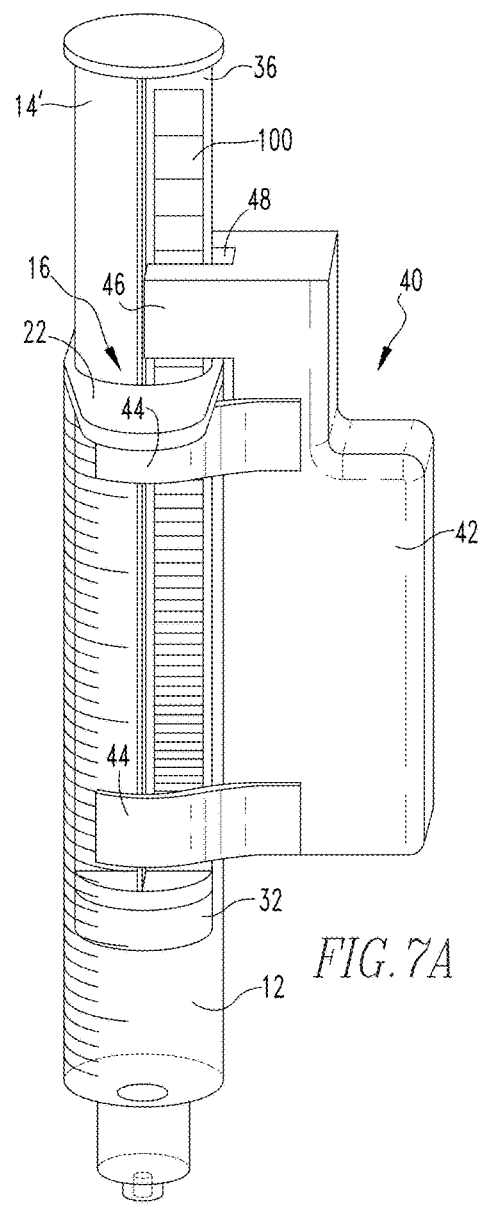

MODULAR, WIRELESS, DRUG SIMULANT INJECTION SENSOR SYSTEM AND METHODS OF EMPLOYING

CROSS REFERENCE TO RELATED APPLICATION

This application claims priority under 35 U.S.C. § 119(e) from U.S. Provisional Application No. 61/980,868, entitled "MODULAR, WIRELESS DRUG INJECTION SENSOR SYSTEM TO ENHANCE SIMULATION-BASED HEALTHCARE TRAINING AND ASSESSMENT OF COMPETENCE", which was filed on Apr. 17, 2014, the disclosure of which is incorporated herein by reference.

FIELD OF THE INVENTION

The present invention pertains to systems and methods for use in healthcare training, and in particular, to a drug injection wireless sensor system for use in such systems and methods.

BACKGROUND OF THE INVENTION

Medication administration errors are among the most prevalent and costly challenges to patient safety. Administration of drugs by intravenous (IV) injection is one of the most common medical procedures. Simulation-based healthcare training offers the ability for trainees to practice drug injection safely and with quantitative feedback on their performance. Because of the importance of training correct administration of drugs by intravenous (IV) injection, some commercial medical simulators include the ability for a trainee to inject fluid into an IV port, with concomitant sensing of the volume and identity of the drug being injected. The actual fluid injected is not a real drug, but instead a drug simulant, which is typically water or saline. Such simulants are both far less expensive and far safer to employ in a training environment compared to real medications. Current medical simulator injection sensing systems are typically built into higher-cost patient simulators. These simulators consist of physical models of a human body (mannequins) that contain a variety of mechatronic components such as sensors and actuators, and a computer control system.

Many commercial simulators, particularly lower-cost simulators, lack the ability to sense injection parameters such as volume, injection rate, and identity of simulated drug, and there is typically no way to add this functionality to existing simulators: they are closed, non-upgradable systems, and the only way for end-users to add this functionality is via a high cost purchase of a new simulator.

Current medical simulators use flow meters to measure the volume of drug simulant injected into the system. Such volume measurements may then feed into physiological models which the simulator utilizes to produce a realistic response. Presently, components of simulators that measure the volume and detect the identity of injected drug simulants are typically located inside the simulators, thus making it difficult for simulation training centers to add such components to existing medical simulators or modify them in any way. If such modifications are attempted, they may void the warranty of the existing simulator. Because simulators can cost upwards of $100,000, it can be cost-prohibitive for medical simulation facilities to purchase new or upgraded simulators as new drug injection training technology becomes available.

In addition, there are significant limitations in the capabilities of existing drug simulant recognition systems. For example, radio-frequency identification (RFID) tags may be attached to a syringe and encoded with a number that associates the syringe with a particular medication. An RFID receiver may then be built into the arm of the medical simulator. But this system fails when more than one syringe is placed near the simulator: the system detects multiple RFID tags, and cannot disambiguate between them. Human operator intervention is then required to observe which of the several syringes is being used by a trainee, and the human operator manually enters the information into the control software for the simulator. This, of course, defeats the purpose of having an automatic drug injection recognition system.

In addition, it would be useful to offer drug injection sensing and measurement capabilities in other simulation-based training contexts and application areas in addition to mannequin-based simulators. These include standardized patients (actors who play the role of a patient for training purposes) and field exercises involving persons playing the role of victims of a mass-casualty event. In both settings, training in the selection and administration of injectable drugs is a critical learning point, but obviously injecting into a real person is not possible. A system that offered the ability to simulate injection into human actors and measure and transmit data on injection parameters would provide important feedback to both trainees and instructors regarding correct diagnosis, drug selection and administration technique.

Accordingly, a need exists for solutions for training drug injection which may be readily incorporated with other existing training solutions or human actors, which provides quantitative feedback, which may be provided at a cost effective manner, and which offers performance improvements compared to current systems.

SUMMARY OF THE INVENTION

Embodiments of the present invention improve upon known devices and methods in a variety of ways. Such embodiments provide devices that can add simulated drug injection sensing capabilities to any simulator, including full-body mannequins, part-task trainers ("injection arms") or even standardized patients. Embodiments of the invention make drug injection measurement accessible to a large user base that desires to add such training capability. Embodiments of the invention are flexible, modular, low-cost compared to alternatives, and usable in a wide range of healthcare training, including medical and nursing schools, simulation centers, hospitals, military medical training centers, community colleges, and EMT and first-responder training facilities. Embodiments of the invention may be readily employed in varying environments from highly controlled surgical environments to field use in completely uncontrolled environments.

Embodiments of the present invention attach to standard syringes and sense the position of the plunger member thereof via an optical measurement technique. Devices in accordance with the present invention are small, lightweight and may be powered by a rechargeable battery or other suitable power source. Devices incorporate a wireless transmitter that sends data regarding the position of a plunger member to an external processing device, such as a computer, smartphone, tablet, or other suitable electronic device. The external device receives the data and determines the start and stop times of plunger movements, the rate of plunger movement, and the total volume displaced by the plunger movement(s). Embodiments of the present invention also send data that identifies the specific device attached to a particular syringe. These data can be used to encode, transmit and log the identity of the simulated drug associated with the syringe. Such information can be shown in a graphical user interface to provide feedback to a trainee or instructor regarding injection parameters such as injection time, rate, volume, and drug identity, as well as other details of the plunger movement which may reveal improper tendencies of the trainee. As embodiments of the present invention function independently of any external simulator, the devices can be used with a wide range of simulators and training scenarios, including standardized patients and large-group field exercises for first responders.

In one non-limiting embodiment, a device for monitoring the position of a plunger member slidingly engaged with a main body of a syringe is provided. The device comprises: a housing structured to be selectively coupled to the main body in a readily removable manner and a monitoring system disposed at least partially on or in the housing. The monitoring system is structured to detect the absolute position of the plunger member with respect to the main body in a manner which does not require any mechanical linkage with the plunger member.

The monitoring system may be structured to detect the absolute position of the plunger member with respect to the main body by determining an amount of light transmitted through a portion of the plunger member.

The monitoring system may comprise: a source of electrical power; a sensing system structured to detect the absolute position of the plunger member with respect to the main body; a processing device electrically coupled to the sensing system and the source of electrical power; and a transmitting device electrically coupled to the processing device, the transmitting device being structured to transmit information received from the processing device.

The housing may comprise a protruding portion which is structured to overhang an opening at a first end of the main body. The protruding portion may include a groove defined therein which is structured to receive a portion of the plunger member. The sensing system may comprise: an optical emitter disposed on a first side of the groove, and an optical detector disposed on a second side of the groove opposite the first side.

The processing device and the transmitting device may be integral portions of a single device.

The source of electrical power may comprise a rechargeable battery.

The housing may comprise a number of resilient arcuate members which extend therefrom in a manner which is structured to selectively couple the housing to the main body.

The device may further comprise an elongated planar sheet of material sized and structured to be coupled to a portion of the plunger member, the material having a transparency which varies in a predetermined manner along the length thereof.

In another non-limiting embodiment, a monitoring system is provided. The monitoring system comprises: a device as previously described and a receiving device structured to receive the data transmitted by the transmitting device.

The receiving device may comprise a processor and a display. The processor may be structured to: receive real-time data from the device, compute from the received data parameters of an injection including, but not limited to: start time, end time, a time-varying volume curve, a time-varying rate curve and an identity of an administered drug, and display one or more of the parameters via a graphical user interface.

In yet another non-limiting embodiment, a plunger member for use with a main body of a syringe is provided. The plunger member comprises: a first end having an elastomeric member structured to slidingly engage an internal passage of the main body; a second end disposed opposite the first end and structured to be engaged by a user of the syringe; and a number of generally planar rib members extending between the first end and the second end. One of the rib members comprises a gradient portion extending generally along the length thereof and the gradient portion has a transparency which varies in a predetermined manner along the length thereof.

The gradient portion may be formed in or on a sheet-like piece of material coupled to an exterior surface of the rib member.

The gradient portion may be integrally formed as a portion of the rib member.

In yet another a further non-limiting embodiment, a system is provided. The system comprises a syringe comprising and a device for monitoring the position of the plunger member of the syringe with respect to the main body of the syringe. The syringe comprises a main body and a plunger member slidingly engaged with the main body. The plunger member comprises: a first end having an elastomeric member structured to slidingly engage an internal passage of the main body; a second end disposed opposite the first end and structured to be engaged by a user of the syringe; and a number of generally planar rib members extending between the first end and the second end. One of the rib members comprises a gradient portion extending generally along the length thereof, the gradient portion having a transparency which varies in a predetermined manner along the length thereof. The device comprises: a housing structured to be selectively coupled to the main body; and a monitoring system disposed at least partially on or in the housing, the monitoring system being structured to detect the absolute position of the plunger member with respect to the main body by determining an amount of light transmitted through the gradient portion.

The housing may comprise a protruding portion which is structured to overhang an opening at a first end of the main body. The protruding portion may include a groove defined therein having a portion of the gradient portion disposed therein. The monitoring system may comprise a source of electrical power; a sensing system comprising: an optical emitter disposed on a first side of the groove, and an optical detector disposed on a second side of the groove opposite the first side; a processing device electrically coupled to the sensing system and the source of electrical power; and a transmitting device electrically coupled to the processing device, the transmitting device being structured to transmit information received from the processing device.

The housing may comprises a number of resilient arcuate members which extend therefrom in a manner which is structured to selectively couple the housing to the main body.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 3A-3C show various views, with FIG. 3A being partially schematic, of an example device for monitoring the position of a plunger member slidingly engaged with a main body of a syringe in accordance with a non-limiting embodiment of the present invention.

FIG. 6 is a partially schematic view of an example plunger member in accordance with a non-limiting embodiment of the present invention.

FIGS. 7A and 7B are views of the known syringe of FIGS. 1 and 2 including a device as shown in FIGS. 3A-3C selectively coupled thereto and a plunger member as shown in FIG. 6 shown disposed in different example positions.

DETAILED DESCRIPTION OF EXEMPLARY EMBODIMENTS

Figure 1:
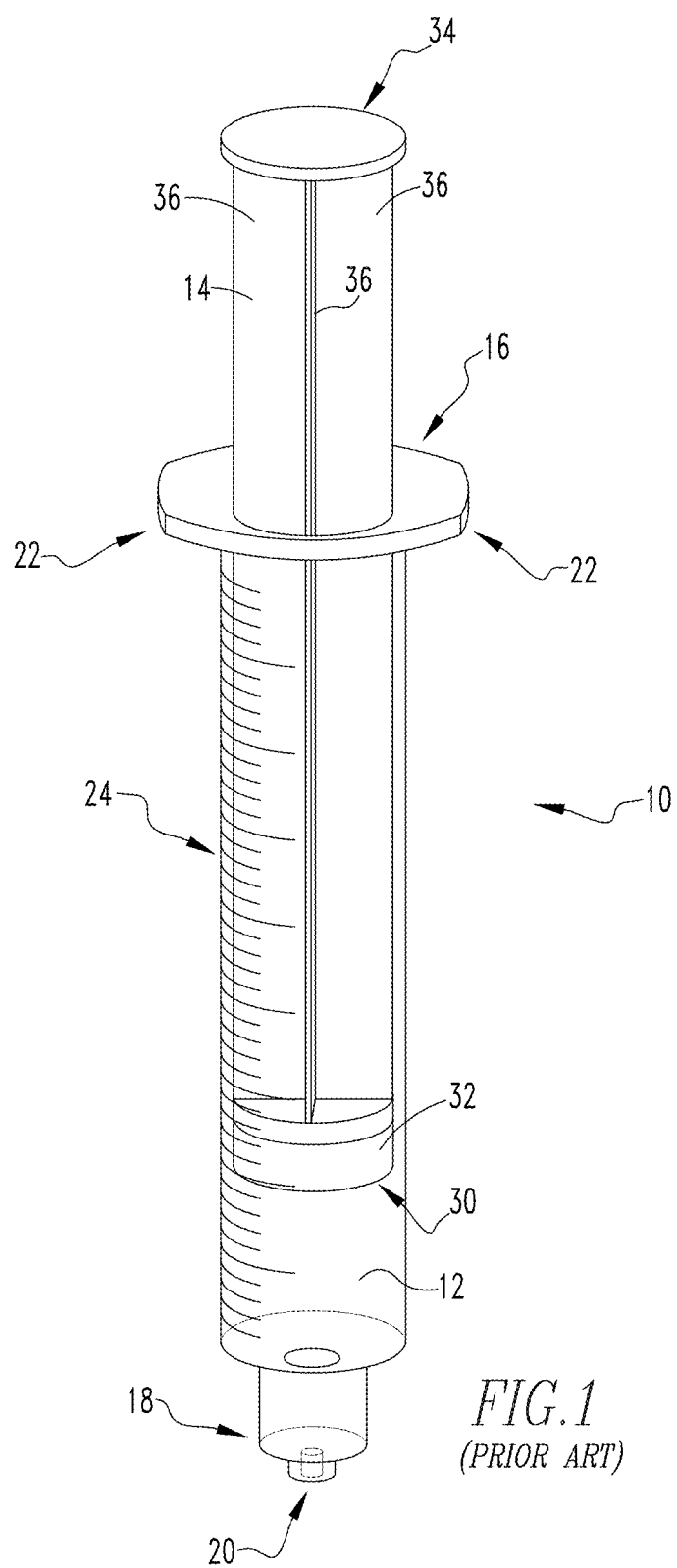
FIG. 1 is an example of a known syringe commonly used in medical treatments.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs.

As used herein, "directly coupled" means that two components are directly in contact with each other.

As used herein, "selectively coupled" means that two components are coupled in a manner such that the components may readily be coupled or uncoupled from each other.

As used herein, "fixedly coupled" or "fixed" means that two components are coupled so as to move as one while maintaining a constant orientation relative to each other.

As used herein, the term "unitary" means a component is created as a single piece or unit. That is, a component that includes pieces that are created separately and then coupled together as a unit is not a "unitary" component or body.

As used herein, the statement that two or more parts or components "engage" one another shall mean that the parts exert a force against one another either directly or through one or more intermediate parts or components.

As used herein, the term "number" shall mean one or an integer greater than one (i.e., a plurality).

As used herein, "processing device" shall be used to refer to a microcontroller or any other suitable processing device and related memory components employed by such device in carrying out processing operations.

As used herein, "optical emitter" shall be used to refer to any device that provides a suitable source of light.

As used herein, "optical detector" shall be used to refer to any sensing device that suitably provides for the detection of light emitted by an optical emitter.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The present invention will now be described, for purposes of explanation, in connection with numerous specific details in order to provide a thorough understanding of the subject invention. It will be evident, however, that the present invention can be practiced without these specific details without departing from the spirit and scope of this innovation.

Figure 2:
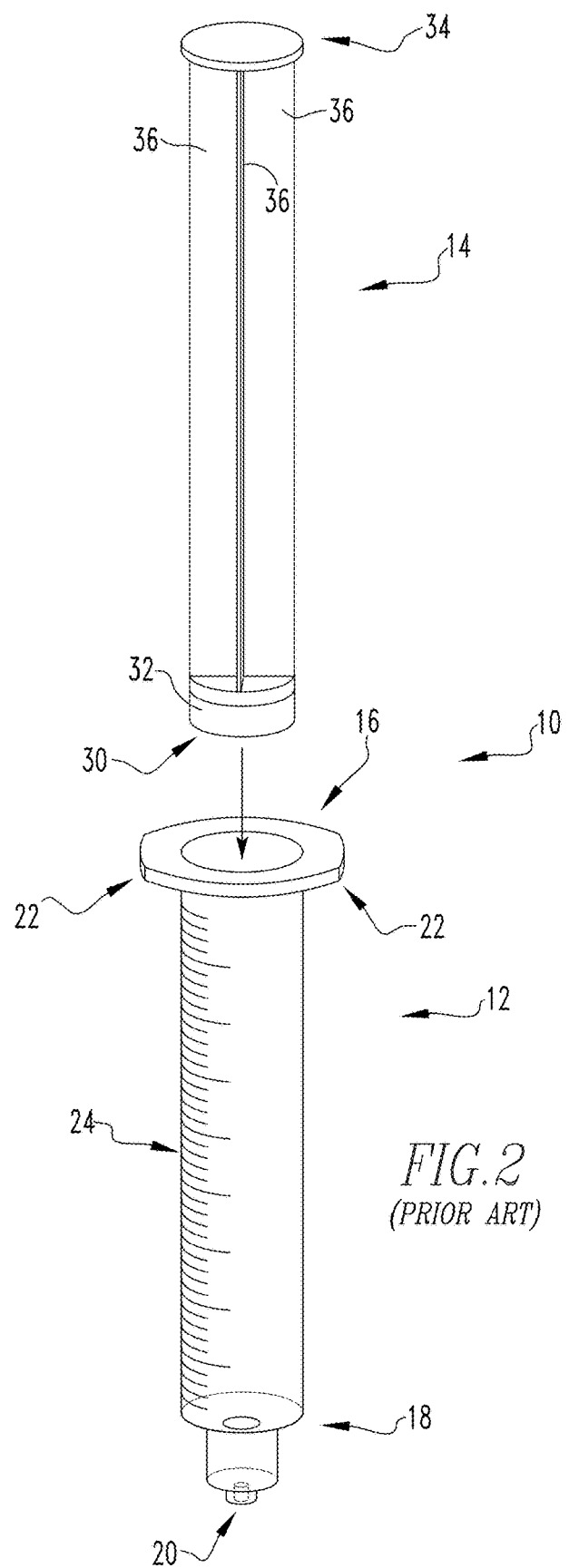
FIG. 2 is a partially exploded view of the known syringe of FIG. 1.

FIGS. 1 and 2 show an example of a syringe 10, in assembled and partially exploded views respectively, such as known in the art and commonly used for injecting desired quantities of a drug into a patient with which embodiments of the present invention may be readily employed.

Syringe 10 includes a main body 12 and a plunger member 14. Main body 12 is generally formed as a hollow cylindrical member having an open first end 16 which is adapted to receive a portion of the plunger member 14 therein and an opposite second end 18 which is generally closed except for a central orifice 20 which is structured to have a hollow needle (not shown), for penetrating into tissue of a patient, coupled thereto. Main body 12 is typically formed from a rigid or semi-rigid transparent material such as plastic, glass, etc. Main body 12 typically further includes a number of flange members 22 (two are shown in the illustrated example) which protrude generally outward from the main body 12 in a manner such that the flange members 22 may be readily engaged by the fingers of a user of the syringe 10 when performing an injection. Main body 12 also typically includes a number of graduated markings 24, provided generally along the length thereof beginning at the second end 18, for use in visually determining the volume of liquid (or gas) contained in the main body 12 or being expelled therefrom.

Plunger member 14 is typically formed from a generally rigid, translucent material (e.g., without limitation, plastic) as an elongate member having a first end 30 which includes an elastomeric portion 32 structured to slidingly engage the hollow cylindrical portion of the main body 12. Plunger member 14 further includes a second end 34 disposed opposite the first end 30 which is structured to be engaged by a user of the syringe 10 in adjusting the relative positioning of the plunger member 14 with respect to the main body 12. A number of generally planar rib members 36 extend between the first end 30 and the second end 34 and are arranged in a manner which generally imparts rigidity to the plunger member 14. In the example embodiment illustrated in FIGS. 1 and 2, four planar rib members 36 (only three are visible in the FIGS.) are arranged generally perpendicular to each other so as to form a generally "x"-shaped cross-section. It is to be appreciated, however, that such arrangement is provided for example purposes only and is not intended to limit the potential scope of the present invention.

Figure 7B:
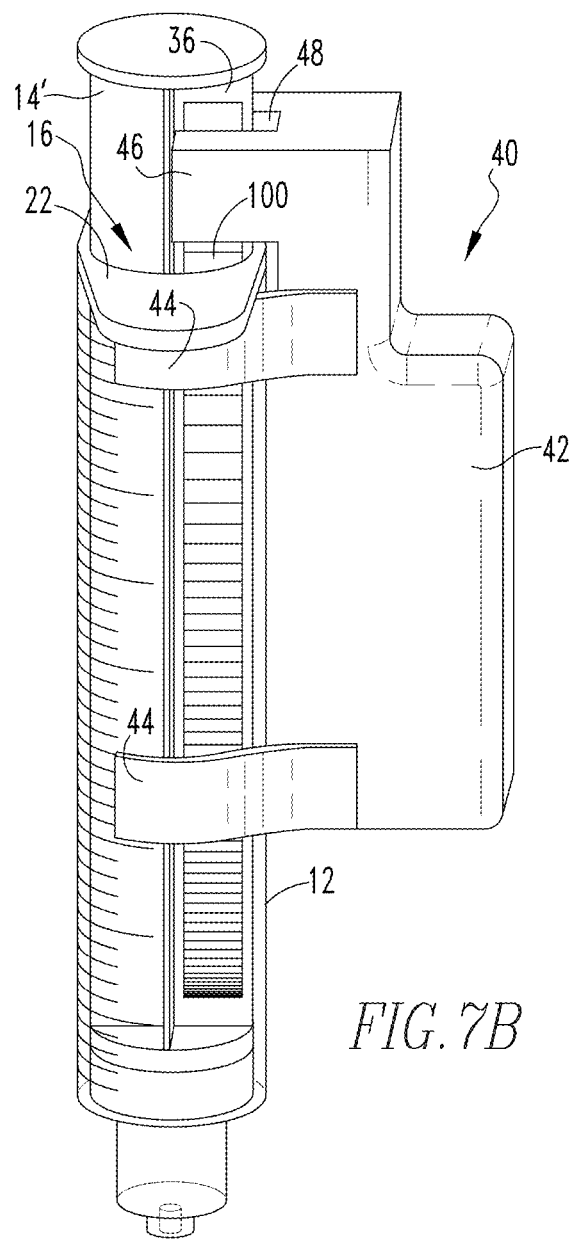

Having thus described an example known syringe 10 with which embodiments of the present invention may be readily employed, an example embodiment of a device 40 for monitoring the position of a plunger member, such as plunger member 14, with respect to the main body 12 in which the plunger member 14 is disposed, will now be described in conjunction with FIGS. 3A-3C which provide a number of different views of an example device 40. Device 40 includes a housing 42 which is structured to be selectively coupled to the main body of a syringe (e.g., main body 12). In the example embodiment shown in FIGS. 3A-3C, such selective coupling is carried out through the use of a number of resilient arcuate members 44 which extend from housing 42 in a manner such that device 40 may be readily snapped onto (or conversely unsnapped from) the main body 12 of the syringe 10, as previously described in conjunction with FIGS. 1 and 2. It is to be appreciated, however, that device 40 may be coupled to the main body 12 via other suitable arrangements without varying from the scope of the present concept. It is also to be appreciated that housing 42 may be varied for use with syringes of other dimensions than syringe 10 shown in FIGS. 1 and 2 without varying from the scope of the present invention. FIGS. 7A and 7B, discussed in detail below, show examples of the device 40 installed on a syringe main body 12 in accordance with a non-limiting example of the present invention. It is to be appreciated that the housing 42 and component arcuate members 44 are designed so as to not visually obscure the graduated markings 24, to be lightweight and minimally obtrusive to syringe use, and to be easy to attach and remove from the syringe, while maintaining secure attachment to the syringe during normal operation and use of the syringe and plunger member thereof. As will be described further below, embodiments of the invention do not require any mechanical linkage with the plunger member in order to sense its position, and thus result in very little to no effect on the feel of the plunger movement.

Continuing to refer to FIGS. 3A-3C, housing 42 further includes a protruding portion 46 which is structured to overhang the first end 16 of main body 12 of syringe 10 when device 40 is coupled to main body 12 (such as shown in FIGS. 7A and 7B). Referring to FIGS. 3A, 7A and 7B, protruding portion 46 includes a groove 48 defined therein which is structured to receive a portion of plunger member 14, more particularly one of the rib members 36 of the plunger member 14, therein.

Figure 4:
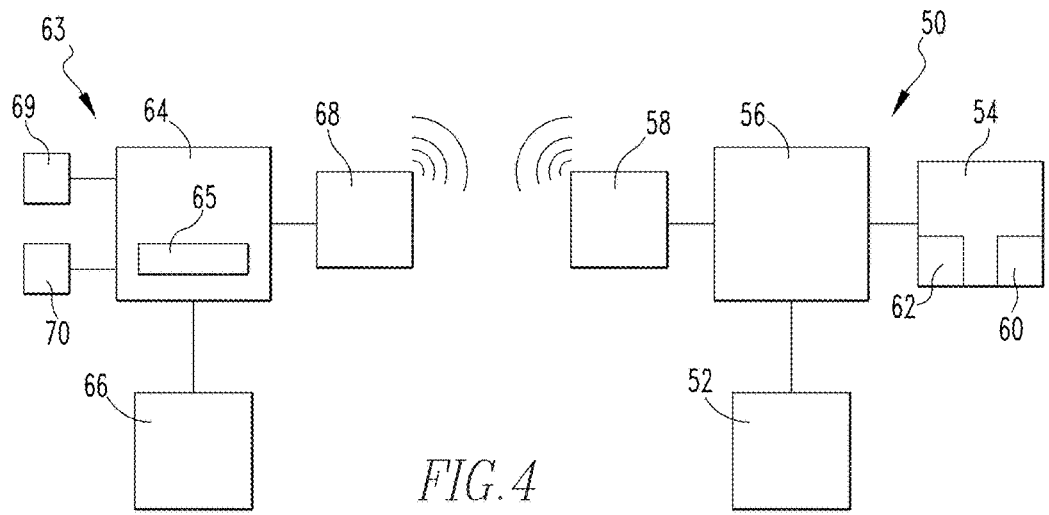
FIG. 4 is an example schematic diagram of a complete system in accordance with the present invention including a monitoring system in accordance with a non-limiting embodiment of the present invention and an example computing system used in conjunction therewith.

Device 40 further includes a monitoring system 50, partially shown schematically in hidden line in FIG. 3A, and shown schematically in FIG. 4, disposed at least partially on or in the housing 42. The monitoring system 50 is structured to detect the absolute position of the plunger member 14 with respect to the main body 12 of the syringe 10 without physically contacting the plunger member 14.

Referring to FIG. 4, the monitoring system 50 includes a source of electrical power 52; a sensing system 54 which is structured to detect the absolute position of the plunger member 14 with respect to the main body 12 of the syringe 10; a processing device 56 electrically coupled with the sensing system 54 and the source of electrical power 52; and a transmitting device 58 (or alternately a transceiver device) electrically coupled to the processing device, the transmitting device 58 is structured to wirelessly transmit information received from the processing device 56. Referring to FIGS. 3A and 4, the sensing system 54 includes an optical emitter 60 (shown schematically in hidden line in FIG. 3A) disposed on a first side of the groove 48 defined in the protruding portion 46 of the housing 42. Sensing system 54 further includes an optical detector 62 (shown schematically in hidden line in FIG. 3A) disposed on a second side of the groove opposite the first side (and the optical emitter). As will be discussed in greater detail below, the optical detector 62 is positioned and structured to detect light emitted by the optical emitter 60.

Figure 8:
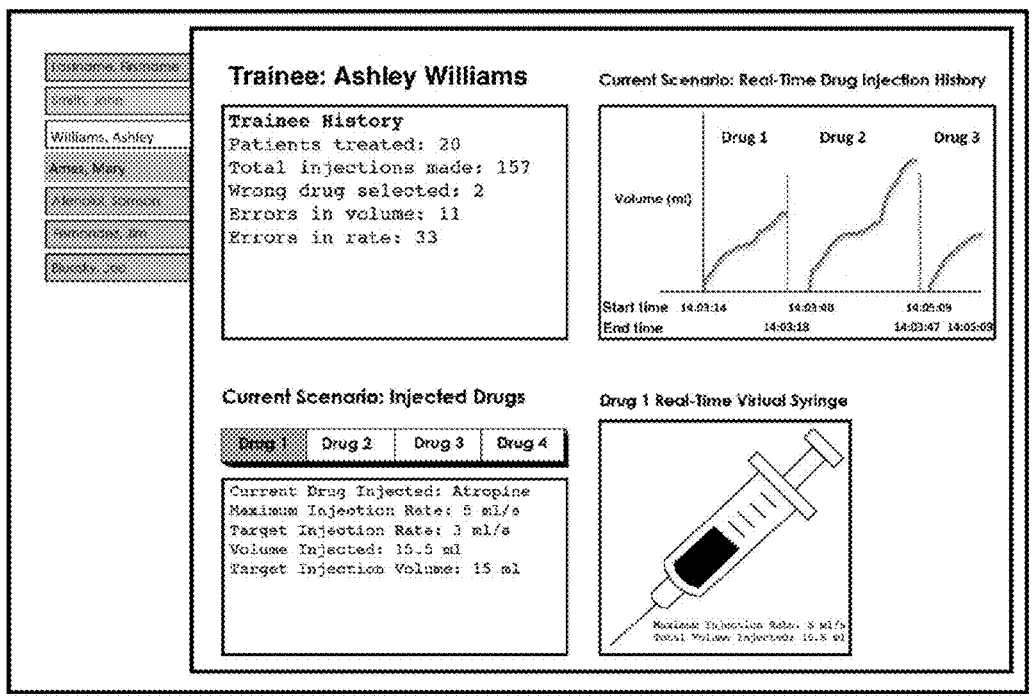
FIG. 8 is an example graphical display in accordance with a non-limiting embodiment of the present invention. This example display shows in a general manner the types of information that may be obtained with use of the system, including a record of training experience and errors made by trainees, comparison of target to actual injection volumes, and graphs of real-time volume-vs.-time curves for multiple injected simulated drugs.

In addition to the monitoring system 50, FIG. 4 further schematically illustrates an example computing system 63 used for interacting with the monitoring system 50. Computing system 63 includes a computing device 64 such as a desktop/laptop/tablet computer, a smartphone, or other suitable electronic device which utilizes software 65 and storage 66 to carry out particular routines/functions and store data. Computing system 63 further includes a wireless receiver or transceiver 68 for receiving data from and/or transmitting data to the monitoring system 50. Computing system 63 further includes a visual display 69 and may optionally include an auditory display 70 for providing audible alerts/alarms. FIG. 8 illustrates an example graphical display in accordance with a non-limiting embodiment of the present invention.

Figure 5:
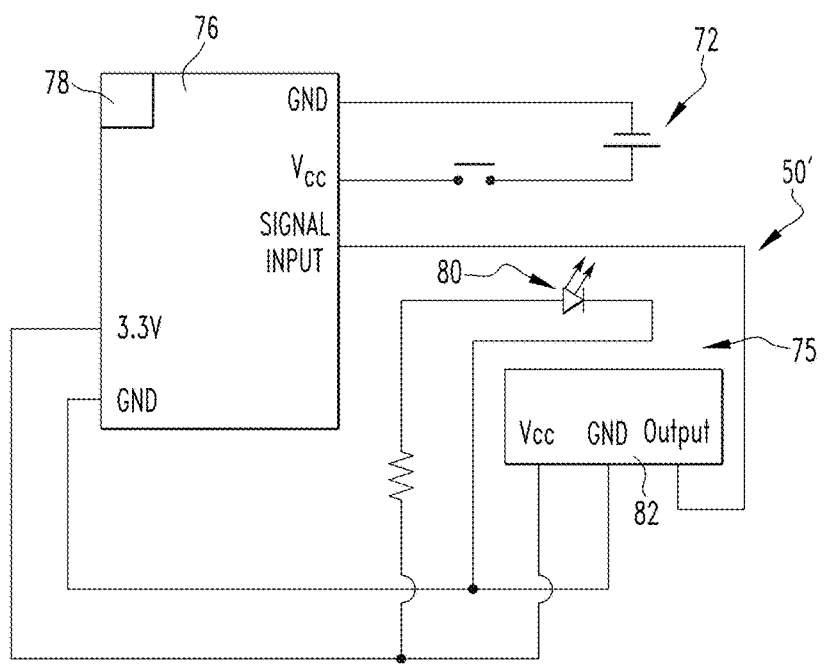
FIG. 5 is an example schematic diagram of a monitoring system in accordance with a non-limiting embodiment of the present invention.

FIG. 5 shows a schematic representation of another example monitoring system 50' in accordance with another example embodiment of the present invention. The monitoring system 50' includes a source of electrical power 72; a sensing system 75 which is structured to detect the absolute position of the plunger member 14 with respect to the main body 12 of the syringe 10; and a Wixel device 76 electrically coupled with the sensing system 75 and the source of electrical power 72. The Wixel device includes a processing device, a communications device/interface 78, and memory combined in a single device, and thus provides for similar functionality as the arrangement described in conjunction with FIG. 4. The communications device/interface 78 may include one or more of a wireless transmitter or wireless transceiver and a USB or other suitable interface for wired connection. Sensing system 75 includes an optical emitter 80 and an optical detector 82 which also function in a similar manner as the arrangement described in conjunction with FIG. 4.

FIG. 6 is a partially schematic view of an example plunger member 14' in accordance with a non-limiting embodiment of the present invention. Plunger member 14' is generally the same as plunger member 14, previously described, except plunger member 14' includes a gradient 100 (shown schematically) having a transparency which varies in a predetermined manner along the length thereof positioned on one of the rib members 36 extending between the first end 30 and the second end 34. In an example embodiment, gradient 100 is formed as a black to clear gradient printed on a clear material which is then adhered to the rib member 36 via a suitable adhesive. In another example embodiment, gradient 100 was directly created on rib member 36. In yet another example embodiment, gradient 100 was formed integrally with rib member 36. It is to be appreciated from such example embodiments that gradient 100 may be formed from any suitable material in any suitable manner as long as the transparency of the rib member 36 and gradient 100 varies in a predetermined manner along the length of the rib member 36.

Having thus described the basic components of example embodiments of the present invention, the use of such components with a syringe will now be described in conjunction with FIGS. 7A and 7B which show views of the known syringe of FIGS. 1 and 2 including a device 40 such as shown in FIGS. 3A-3C selectively coupled thereto and a plunger member 14' as shown in FIG. 6 shown disposed in different positions. From the views of FIGS. 7A and 7B, it can readily be seen that when device 40 is coupled to main body 12, the protruding portion 46 thereof generally over- hangs the first end 16 of main body 12, and further that the groove 48 defined in the protruding portion 46 receives the rib member 36 having the gradient 100 therein. As the optical emitter 60 and optical detector 62 as previously described in conjunction with FIG. 3A are disposed on opposing sides of the groove 48, the arrangement as shown in FIGS. 7A and 7B places the gradient 100 directly between the optical emitter 60 and the optical detector 62. As a result of such arrangement, movement of the plunger member 14' (in either direction) results in a different portion of the gradient member 100 being disposed between the optical emitter 60 and optical detector 62, thus resulting in different light transmittance to the optical detector 62 which results in a variable voltage output from the optical detector corresponding to the different gradient/plunger positions. Although not shown in the example embodiment illustrated in FIGS. 7A and 7B, it is to be appreciated that one or more environmental light blocking elements may be utilized at or about one or both of the optical emitter 60 and optical detector 62 in order to reduce/eliminate potential interference resulting from external light sources. In an example embodiment, a plurality of brush-like filament members has been employed to reduce/eliminate such potential interfering external light, however other suitable elements may be used without varying from the scope of the present invention.

The voltage output of the optical detector therefore varies in a one-to-one correspondence with plunger position. Since the optical detector is contained within the housing that is affixed to the syringe body 12, and the optical gradient is affixed to the sliding plunger 14, the variable voltage output of the optical detector may be used to measure the position of the plunger with respect to the syringe body. As the position of the plunger with respect to the syringe body correlates with the volume of fluid contained within the syringe, the variable voltage output of the optical detector correlates with the volume of fluid within the syringe. In one embodiment of the present invention, the optical characteristics of the gradient and response characteristics of the optical detector are matched so as to result in a linear change in detector voltage output with plunger position. In this case, the voltage output of the detector linearly corresponds to the volume of fluid in the syringe. The voltage can be calibrated to volume by measuring the voltage at two plunger positions, typically corresponding to zero and maximum volume of the syringe, and then linearly interpolating voltage readings to obtain volume. It will be appreciated, however, that other functional relationships between detector output and plunger position can also be used to translate voltage to volume, so long as the characteristics of the gradient and optical detector are such that the voltage output of the detector as a function of plunger position is strictly monotonically increasing (or decreasing), that is, the voltage output has a one-to-one correspondence with plunger position.

The voltage output of the optical detector is converted to a volume value by the microcontroller 56 (either by linear interpolation or other mathematical translation, such as a lookup table). The volume data is then transmitted via the wireless transmitter 58 to a receiver connected to an instructor's computer or other monitoring station. Alternatively, the voltage output value may be transmitted, and the translation to a volume value performed by the receiving computer.

The receiving computer monitors the volume data being transmitted from the wireless monitoring system. A constant volume value indicates that the syringe is quiescent and no injection is occurring. If the volume value changes above a predetermined threshold, this is interpreted as indicating the start of an injection. The date and time at which the injection starts is recorded and logged. As the injection is occurring, the real-time data of syringe volume are transmitted, received by the instructor's computer and logged. This data stream provides a time-varying profile of the injection by the trainee. When volume changes cease, the time is logged and this is interpreted as the conclusion of the injection.

The time-varying, instantaneous rate of the injection may be determined by numerical differentiation of the volume curve.

Embodiments of the invention disclosed herein, in addition to wirelessly transmitting the current real-time position of the plunger member (from which data volume of injection and rate of injection can be derived) also offer the ability to identify the syringe being used. If a particular syringe is then assigned as containing a specified (simulated) drug, the system offers a means to communicate what drug is being injected. The ability of a simulator to recognize an injected drug simulant (real drugs are not commonly used for reasons of cost and safety—so surrogate solutions are typically employed) adds immense value to simulation-based training. The simulator can then respond realistically to the injected drug simulant with changes in vital signs such as heart rate, blood pressure, level of consciousness or other variables. This real-time response provides valuable feedback to the trainee.

The microcontroller inside each device is assigned a unique identifying number. Each time the system transmits plunger position data, this data is sent in a packet that includes the ID number. This enables syringe position data to be uniquely associated with a particular syringe among many which may be in use at a given time. A way in which such arrangement can support communicating the identity of a drug being injected into a simulator can be appreciated from the following example:

Suppose that in a given simulation-based training scenario, the trainee is to administer two different drugs to the simulated patient: epinephrine and propranolol. Two syringes are employed for the scenario: Syringe A and Syringe B. Syringe A is filled with fluid representing epinephrine; Syringe B is filled with fluid representing propranolol. Assume the previously described device 40 affixed to Syringe A contains a microcontroller with ID number 152. Syringe B has a device 40 with ID number 401. At the start of the training scenario, the user would simply specify, via a software interface, that Syringe A, transmitting with ID "152", is to be identified as epinephrine. Likewise, Syringe B, transmitting with ID "401" is identified as containing propranolol. When the syringes are used in the scenario, the control computer receives data packets containing ID numbers and syringe plunger position values. All plunger position data tagged with the ID "152" are identified as representing injection of epinephrine, and all plunger position data tagged with ID "401" are identified as representing injection of propranolol. These data can then be sent to a physiological modeling program that can create responses in simulator variables such as heart rate, based on the time, rate, amount and identity of drug injected.

The above method provides several advantages over the current state-of-the art for injection recognition in simulators, which is currently based on the use of RFID tags attached to syringes to identify the drug, and flow meters built into the simulator to measure the rate and volume of injected fluid. The RFID tag approach fails if multiple syringes are placed in proximity to the simulator. In such case, the system picks up multiple RFID identifiers, but cannot associate them with measurements of flow that are made internal to the simulator. Following the above example, suppose Syringe A and Syringe B were tagged with RFID tags that identified them as containing epinephrine and propranolol, respectively. Both syringes are then placed near the simulated patient (common in clinical practice). A trainee then picks up Syringe A and injects its contents into the simulator. The simulator registers that fluid is flowing into its simulated vein, but it cannot disambiguate the identity, since the RFID antenna in the simulator will pick up both RFID identifies, and not be able to determine which is associated with the flow input.

In contrast, by employing embodiments of the present invention, the system could determine that it was simulated epinephrine being injected. Furthermore, even if both syringes were being used at the same time to inject drugs into the simulated patient, the ID-tagging of each plunger position datum would result in the ability to follow the injection profile (rate and volume vs. time) of each injection, even if occurring simultaneously. This is a capability not available in the current state of the art.

As another example, embodiments of the present invention may be used in a mass-casualty field training exercise. In such training exercises, volunteers are recruited to serve the role of victims/patients, and first responders arrive at the scene to treat them in a simulated manner. Assessment is typically made by direct observation by instructors, but such observation can be subjective and lacks quantitative assessment of skills, such as injection technique.

For example, in a training event for a case in which a nerve agent such as Sarin is dispersed, a treatment protocol includes the administration by IV injection of the drugs Atropine and Pralidoxime to each victim. Embodiments in accordance with the present invention could be attached to two syringes in each first responder's kit, one representing Atropine, one Pralidoxime. Each syringe is actually filled with a non-drug liquid such as water or saline. A cohort of first responders then arrive at the scene and begin triaging and treating the simulated victims. Since each device transmits a unique ID number, both the drug associated with each syringe and the first responder using the syringe can be identified. Each first responder administers treatment by simulating catheter placement in the arm of a victim, and then injecting the water in each syringe into the catheter, which can simply be disposed of onto the ground—i.e., no actual injection is made into the simulated patients. The time, rate, volume and identity of each administered drug is transmitted from each syringe to a central monitoring computer, which compiles and logs all data. This data provides insight into when and whether each trainee administered the correct amount of each agent and in the correct order. This information can then be used for after-action debriefing, assessment and performance improvement.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A device for monitoring the position of a plunger member slidingly engaged with a main body of a syringe, the device comprising:
    a housing structured to be selectively coupled to the main body in a readily removable manner; and
    a monitoring system disposed at least partially on or in the housing, the monitoring system being structured to detect the absolute position of the plunger member with respect to the main body in a manner which does not require any mechanical linkage with the plunger member,
    wherein the monitoring system comprises:
        a source of electrical power;
        a sensing system structured to detect the absolute position of the plunger member with respect to the main body;
        a processing device electrically coupled to the sensing system and the source of electrical power, the processing device having a unique identifying number; and
        a transmitting device electrically coupled to the processing device, the transmitting device being structured to transmit information received from the processing device along with the unique identifying number of the processing device.

2. The device of claim 1, wherein the monitoring system is structured to detect the absolute position of the plunger member with respect to the main body by determining an amount of light transmitted through a portion of the plunger member.

3. The device of claim 1, wherein:
    the housing comprises a protruding portion which is structured to overhang an opening at a first end of the main body;
    the protruding portion includes a groove defined therein which is structured to receive a portion of the plunger member; and
    the sensing system comprises:
        an optical emitter disposed on a first side of the groove, and
        an optical detector disposed on a second side of the groove opposite the first side.

4. The device of claim 1, wherein the processing device and the transmitting device are integral portions of a single device.

5. The device of claim 1, wherein the source of electrical power comprises a rechargeable battery.

6. The device of claim 1, wherein the housing comprises a number of resilient arcuate members which extend therefrom in a manner which is structured to selectively couple the housing to the main body.

7. The device of claim 1, further comprising an elongated planar sheet of material sized and structured to be coupled to a portion of the plunger member, the material having a transparency which varies in a predetermined manner along the length thereof.

8. A monitoring system comprising:
a plurality of devices as recited in claim 1; and
a receiving device structured to receive the information transmitted by each of the transmitting devices, including the unique identifying number of each of the processing devices.

9. The monitoring system of claim 8 wherein the receiving device comprises:
a processor; and
a display,
wherein the processor is structured to:
receive real-time data from the plurality of devices, including the unique identifying numbers of the processing devices,
enable a user, via a software interface, to associate the unique identifying number of each processing device with the identity of a simulated drug,
enable a user, via a software interface, to associate the unique identifying number of each processing device with a person using that device,
compute from the received data the parameters of an injection including, but not limited to: start time, end time, a time-varying volume curve, a time-varying rate curve, an identity of an administered drug, and the identity of a user of the device, and
display one or more of the parameters via a graphical user interface.

10. A system comprising:
a syringe comprising:
a main body, and
a plunger member slidingly engaged with the main body, the plunger member comprising:
a first end having an elastomeric member structured to slidingly engage an internal passage of the main body;
a second end disposed opposite the first end and structured to be engaged by a user of the syringe; and
a number of generally planar rib members extending between the first end and the second end, wherein one of the rib members comprises a gradient portion extending generally along the length thereof, the gradient portion having a transparency which varies in a predetermined manner along the length thereof; and
a device for monitoring the position of the plunger member with respect to the main body, the device comprising:
a housing structured to be selectively coupled to the main body; and
a monitoring system disposed at least partially on or in the housing, the monitoring system being structured to detect the absolute position of the plunger member with respect to the main body by determining an amount of light transmitted through the gradient portion, wherein the monitoring system comprises:
a processing device electrically coupled to the sensing system and the source of electrical power, the processing device have a unique identifying number; and
a transmitting device electrically coupled to the processing device, the transmitting device being structured to transmit information received from the processing device along with the unique identifying number of the processing device.

11. The system of claim 10, wherein:
the housing comprises a protruding portion which is structured to overhang an opening at a first end of the main body;
the protruding portion includes a groove defined therein having a portion of the gradient portion disposed therein; and
the monitoring system comprises:
a source of electrical power;
a sensing system comprising:
an optical emitter disposed on a first side of the groove, and
an optical detector disposed on a second side of the groove opposite the first side.

12. The system of claim 11, wherein the housing comprises a number of resilient arcuate members which extend therefrom in a manner which is structured to selectively couple the housing to the main body.

* * * * *

UNITED STATES PATENT AND TRADEMARK OFFICE
CERTIFICATE OF CORRECTION

PATENT NO. : 10,083,630 B2  
APPLICATION NO. : 14/689758  
DATED : September 25, 2018  
INVENTOR(S) : Joseph Thomas Samosky Page 1 of 1

It is certified that error appears in the above-identified patent and that said Letters Patent is hereby corrected as shown below:

In the Specification

Column 4, Line 57, "may comprises" should read --may comprise--.
Column 7, Line 67, "groove opposite" should read --groove 48 opposite--.

In the Claims

Column 14, Line 13, Claim 10, "the absolute position" should read --the position--.

Signed and Sealed this
Thirtieth Day of July, 2019

Andrei Iancu
*Director of the United States Patent and Trademark Office*